US012460865B2

(12) United States Patent
Gubiani et al.

(10) Patent No.: US 12,460,865 B2
(45) Date of Patent: Nov. 4, 2025

(54) APPARATUS AND METHOD FOR SUPPLYING A GAS TO A FURNACE FOR THE PRODUCTION OF METAL

(71) Applicant: MORE S.r.l., Gemona del Friuli (IT)

(72) Inventors: Federico Gubiani, Gemona del Friuli (IT); Luca Sabidussi, Gemona del Friuli (IT); Stefano Morsut, Udine (IT)

(73) Assignee: MORE S.R.L., Gemona del Friuli (IT)

( * ) Notice: Subject to any disclaimer, the term of this patent is extended or adjusted under 35 U.S.C. 154(b) by 366 days.

(21) Appl. No.: 18/200,914

(22) Filed: May 23, 2023

(65) Prior Publication Data
US 2023/0384031 A1 Nov. 30, 2023

(30) Foreign Application Priority Data
May 24, 2022 (IT) .......................... 102022000010706

(51) Int. Cl.
F27B 3/22 (2006.01)
C21C 5/52 (2006.01)
G05D 7/06 (2006.01)

(52) U.S. Cl.
CPC ................ *F27B 3/22* (2013.01); *C21C 5/527* (2013.01); *G05D 7/0635* (2013.01)

(58) Field of Classification Search
CPC .... F27B 3/22; F27B 3/085; F27B 7/36; C21C 5/527; F27D 3/16; F27D 2003/166; F27D 2003/167; F27D 2003/168
See application file for complete search history.

(56) References Cited

U.S. PATENT DOCUMENTS

2002/0096809 A1 7/2002 Shver et al.
2015/0345785 A1 12/2015 Valentine et al.

FOREIGN PATENT DOCUMENTS

DE 19625537 C1 * 4/1997 ........... C21C 5/5217
KR 2012 0097039 A 9/2012
WO 9937822 A1 7/1999
WO 2018234481 A1 12/2018

OTHER PUBLICATIONS

Search Report issued Jan. 24, 2023 in IT 202200010706.

* cited by examiner

*Primary Examiner* — Gregory A Wilson
(74) *Attorney, Agent, or Firm* — Panitch Schwarze Belisario & Nadel LLP

(57) ABSTRACT

An apparatus for supplying gas to a determinate number of injector devices of a melting furnace for the production of metal, including a main feed line, a first secondary feed line and a second secondary feed line which are respectively configured to supply, selectively and in a controlled manner, a process gas, an inert gas and a purge gas to each of the injector devices.

12 Claims, 1 Drawing Sheet

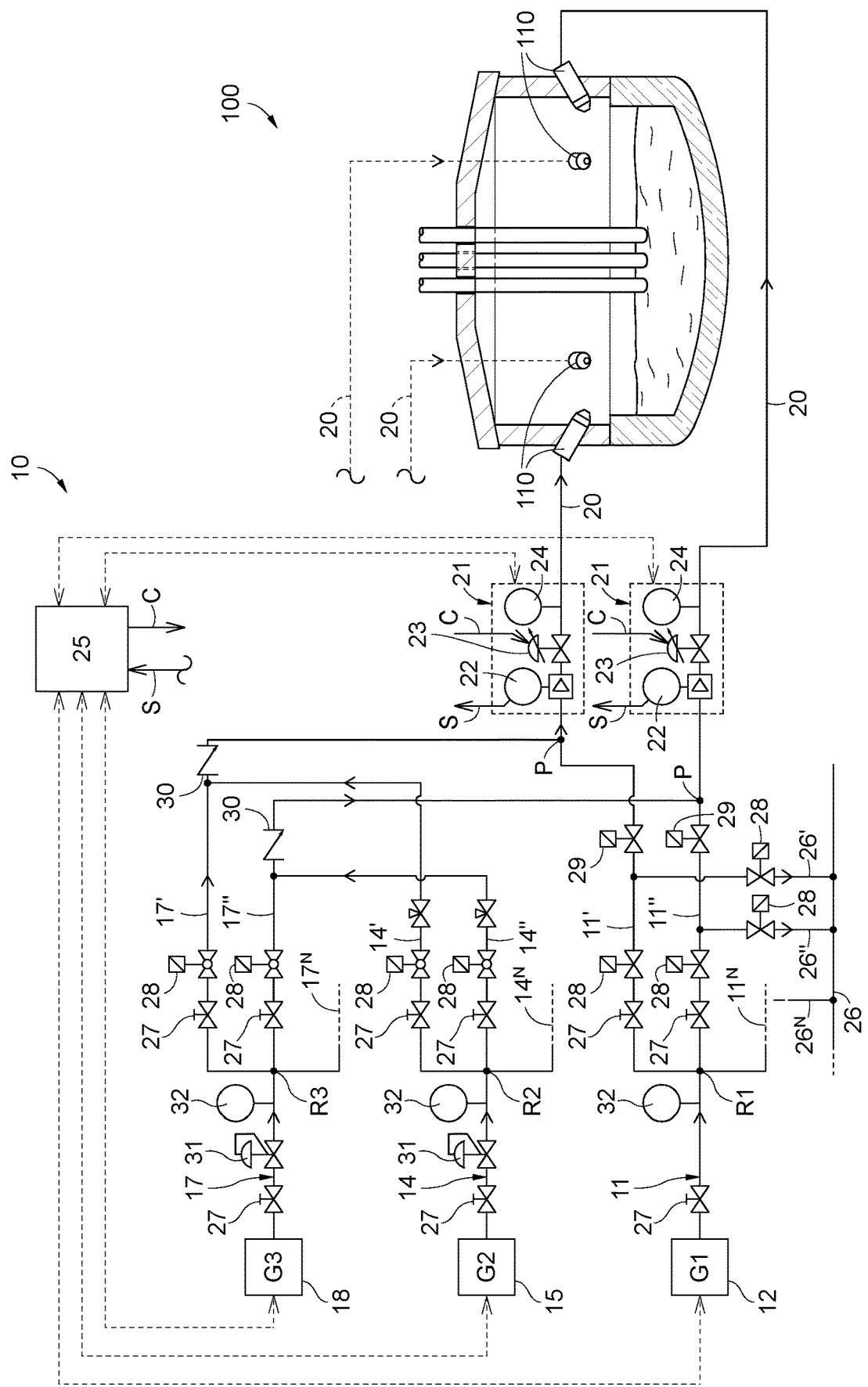

APPARATUS AND METHOD FOR SUPPLYING A GAS TO A FURNACE FOR THE PRODUCTION OF METAL

FIELD OF THE INVENTION

The present invention concerns an apparatus and a method for supplying gas to injector devices of a melting furnace, for example an electric arc furnace, for the production of metal.

BACKGROUND OF THE INVENTION

Apparatuses for supplying gas to injector devices, such as lances and/or burners for example, are known, used both in melting furnaces, and in particular in electric arc furnaces, and also in other applications of the iron and steel and metallurgical industries, to introduce a process gas in a controlled manner with the aim of increasing the thermal energy inside the melting furnace, or of contributing to the refining operations of the molten metal bath.

Inside the melting furnace there are normally incandescent particles, splashes of liquid metal or slag, and dust, which means the internal ends of the injector devices are particularly subject to infiltrations of materials which could cause them to become clogged.

Most known gas supply apparatuses comprise means for supplying a process gas, which can for example be natural gas, LPG, methane, and one or more main feed lines which branch into a plurality of parallel peripheral feed lines, each fluidically feeding a respective injector device.

Here and hereafter in the description and in the claims, the term "supply means" is to be understood as any mean, component, member or element capable of delivering a gas, such as gas storage devices, devices for measuring the physical parameters of the gas, devices for generating the pressure of the gas, gas shut-off devices of the "open/closed" type, and other per se known devices.

However, known apparatuses have the disadvantage that, in order to prevent the clogging of the injector devices, the latter have to continuously deliver the process gas, even when it is not necessary. This leads to high operating costs, because the process gas, which has a high cost, is also consumed during those periods when the melting furnace is turned off and powered on, as well as during non-productive periods. In fact, interrupting the delivery of the process gas would be harmful because the injector devices would clog without the certainty of being unblocked at the next cycle of opening the feed line, given the particular clogging nature of the particles generated inside the melting furnace.

Gas supply apparatuses are also known which also comprise, in addition to the main feed line, a secondary feed line fluidically connected to the injector devices in order to deliver purge gas, generally consisting of compressed air. The supply of the purge gas is alternated with the supply of the process gas, with the function of preventing the clogging of the injector devices. In these gas supply apparatuses, only the flow rate of the process gas is regulated, while the purge gas is fed in an "open/closed" mode, without any control of its flow rate.

A very dangerous and unacceptable disadvantage of these known apparatuses is that the succession of the process gas and the purge gas could generate an explosive mixture inside the feed lines.

The need to time separate the supply of process gas from the supply of purge gas has led to the development of other gas supply apparatuses, which comprise an additional secondary feed line to selectively supply an inert gas, for the period of time necessary to saturate the feed line, before the purge gas is fed, and vice versa.

However, activating the inert gas and purge gas feed lines in "open/closed" mode is not sufficient to guarantee that the apparatus is safe or that the efficiency of the injector devices will be maintained.

In particular, the state of the art includes the following patent documents: US 2002/096809 A1; KR 2012-0097039 A; WO 2018/234481 A1; WO 99/37822 A1; US 2015/345785 A1.

Document US 2002/096809 A1 details a burner for injecting particulate matter and two types of gases into an electric arc furnace. Upstream of the burner there are provided two gas feed lines and one particulate matter feed line which flow directly into the burner. The flow of the particulate matter and the two types of gasses is controlled by means of valves controlled by a control unit.

Document KR 2012-0097039 A discloses an apparatus for controlling an agitation gas for blowing in an electric furnace, comprising a plurality of gas feed lines, each of which is connected directly to one of the injectors of the electric furnace. A control unit is present for opening and closing valves which are installed in the gas feed lines.

Document WO 2018/234481 A1 discloses a shaft furnace into which, by means of a plurality of injectors, both an oxidizing gas and also a test fluid can be injected at a predetermined pressure. Each injector is associated with a regulation valve and a flow sensor which are controlled by a control unit, which regulates the regulation valve for the delivery of the oxidizing gas, based on the flow rate of the test fluid detected by the sensor.

Document WO 99/37822 A1 discloses a device and a method for feeding the injectors of an electric furnace, by sending a comburent mixture consisting of oxygen and neutral gas in defined percentages to each injector. The device comprises, for each injector, an oxygen feed line and a neutral gas feed line, which are connected to each other downstream of a mixing device disposed immediately upstream of the injector.

Document US 2015/345785 A1 discloses a system for controlling a flow of reactant in a furnace in a process which includes an injection distribution module for supplying water to a plurality of injection lances and metering valves for metering the supply of a reducing agent to the injection lances.

There is therefore the need to perfect an apparatus and a method for supplying gas to a furnace for the production of metal which can overcome at least one of the disadvantages of the state of the art.

To do this, it is necessary to solve the technical problem of regulating, in addition to the process gas flow rate, also the inert gas and purge gas flow rates without increasing the complexity of the apparatus, and therefore its cost.

One purpose of the present invention is to provide an apparatus and perfect a method for supplying gas to injector devices of a melting furnace for the production of metal which allow to regulate in a simple and continuous manner the flow rate of all the different types of gases that are introduced into the melting furnace.

Another purpose of the present invention is to provide an apparatus and perfect a method for supplying gas to injector devices of a furnace for the production of metal which consists of a limited number of components and therefore has a low cost, but which at the same time guarantees a high safety standard.

Another purpose of the present invention is to provide an apparatus and perfect a method for supplying gas to injector devices of a furnace for the production of metal in which the gas supply performances are high and independent of the degree of wear and deterioration of the apparatus.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, and to resolve the technical problem disclosed above in a new and original way, also achieving considerable advantages compared to the state of the prior art, an apparatus for supplying gas, according to the present invention, to a determinate number of injector devices of a melting furnace for the production of metal comprises:
- a main feed line fluidically connected to at least first supply means and configured to selectively supply a process gas to each of the injector devices;
- a first secondary feed line fluidically connected to second supply means and configured to selectively supply an inert gas to each of the injector devices; and
- a second secondary feed line fluidically connected to third supply means and configured to selectively supply a purge gas to each of the injector devices,
- wherein the main feed line, the first secondary feed line and the second secondary feed line converge in common terminal segments, each of which is fluidically connected to a respective one of the injector devices.

In accordance with one aspect of the present invention, the apparatus also comprises a regulation unit disposed on each of the terminal segments and configured to regulate the flow rate of the one gas amongst the gases that is temporarily conveyed toward a respective injector device.

In accordance with another aspect of the present invention, the main feed line and the secondary feed lines branch into a determinate number of peripheral main feed lines and peripheral secondary feed lines, respectively, wherein each first and second peripheral secondary feed line is fluidically connected to a corresponding peripheral main feed line in a same connection point which is upstream of the respective one of the terminal segments.

In accordance with another aspect of the present invention, each regulation unit comprises, in sequence, a flow meter and a regulation valve which is configured to be commanded in a calibrated manner in order to regulate the flow rate of the gas in transit on the basis of both the process requirements and also the type of gas in transit.

In accordance with another aspect of the present invention, the apparatus also comprises a control unit operatively connected both to the supply means and also to the regulation units, and configured at least to control the selective activation/deactivation of the first, second and third supply means and the selective calibrated opening/closing of the regulation valves at least on the basis of a measurement signal received from the flow meters of the respective regulation units.

In accordance with another aspect of the present invention, the control unit is programmed to perform an open loop control of the flow rate of the inert gas.

In accordance with another aspect of the present invention, the control unit is programmed to perform a closed or open loop control of the flow rate of the process gas and of the purge gas.

In accordance with another aspect of the present invention, the apparatus also comprises a ventilation line fluidically connected at least to the main feed line, wherein each peripheral main feed line is fluidically connected to the ventilation line by means of a secondary ventilation line which is located upstream of each connection point.

Some embodiments also concern a method for supplying gas to a determinate number of injector devices of a furnace for the production of metal, comprising the following steps:
- a main feed step, in which the first supply means selectively supply the process gas to each of the injector devices through the main feed line;
- a first secondary feed step, in which the second supply means selectively supply the inert gas to each of the injector devices through the first secondary feed line;
- a second secondary feed step, in which the third supply means selectively supply the purge gas to each of the injector devices through the second secondary feed line,
- wherein the main feed line and the first and second secondary feed lines converge in common terminal segments, each of which is fluidically connected to a respective one of the injector devices.

In accordance with one aspect of the present invention, in each of the feed steps the flow rate of each of the gases is selectively regulated by means of the corresponding regulation units, each disposed on a respective one of the terminal segments.

In accordance with another aspect of the present invention, the method also comprises a measuring step, in which the flow rate of the gases is measured by means of flow meters and regulated by means of regulation valves of the regulation units, and a control step in which the control unit controls the selective activation/deactivation of the first, second and third supply means and the selective calibrated opening/closing of the regulation valves at least on the basis of the measurement signal received from the flow meters.

In accordance with another aspect of the present invention, the control unit performs an open loop control of the flow rate of the inert gas.

In accordance with another aspect of the present invention, the control unit performs a closed or open loop control of the flow rate of the process gas and of the purge gas.

In accordance with another aspect of the present invention, the control unit performs a compensation of the measurement signal on the basis of physical parameters consisting of at least one of either temperature, density or pressure of the gases, in order to obtain a compensated measurement signal which represents a mass flow value and is used to generate a control signal for each of the regulation valves.

DESCRIPTION OF THE DRAWINGS

These and other aspects, characteristics and advantages of the present invention will become apparent from the following description of one embodiment, given as a non-restrictive example with reference to the attached drawing in which the only image is a diagram of an apparatus for supplying gas to a furnace for the production of metal, according to the present invention.

We must clarify that in the present description the phraseology and terminology used, as well as the image in the attached drawing also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawing.

DESCRIPTION OF AN EMBODIMENT OF THE PRESENT INVENTION

With reference to the attached drawing, an apparatus 10 according to the present invention is suitable to supply three different types of gasses G1, G2, G3, respectively a process gas, an inert gas and a purge gas, as will be described in detail below, to a determinate number N, for example from 2 to 20, of injector devices 110 of a melting furnace 100 for the production of metal. The melting furnace 100 can be of any known type, for example, an electric arc furnace. The injector devices 110 can also be of any known type and can consist, for example, of lances, burners, or similar devices.

The apparatus 10 comprises a main feed line 11 fluidically connected to at least first supply means 12 and configured to selectively supply the process gas G1 to each of the injector devices 110.

The process gas G1 can be a combustible gas or a comburent gas. The function of the process gas G1 is to increase the input of thermal energy within the melting furnace 100 in a controlled manner, or to supply a gas which contributes during the refining process of the molten metal bath.

By way of example only, the combustible process gas G1 can be selected from a group comprising methane, LPG, hydrogen, acetylene, other combustible gases or a combination thereof. The comburent process gas G1 can be selected, for example, from a group comprising air, oxygen, nitrite-based gases, nitrates, chlorine, fluorine, ozone, permanganates, peroxides, oxides, other comburent gases or a combination thereof.

By way of example, if the process gas G1 is natural gas, the pressure of the process gas G1 at exit from the first supply means 12 can be approximately 3 bar and the maximum flow rate approximately 600 $Nm^3/h$ for each injector device 110.

The apparatus 10 also comprises a first secondary feed line 14 fluidically connected to second supply means 15 and configured to selectively supply the inert gas G2 to each of the injector devices 110.

The function of the inert gas G2, which is normally supplied in continuity with the process gas G1, preferably immediately after the interruption of the delivery thereof, is to saturate at least one terminal segment of the main feed line 11 in order to prevent the generation of possible explosive mixtures with the gas that will be supplied subsequently and passes through the terminal segment, as will be described in detail below. The inert gas G2 is normally supplied for a very short period of time T1, necessary to saturate the terminal part of the main feed line 11 and which is indicatively of the order of seconds, preferably from about 5 to about 30 seconds.

The inert gas G2 also has the very important function of preventing the injector devices 110 from clogging.

It is clear that the flow rate of the inert gas G2, which is correlated to its speed, is the most important operating parameter to consider in order to determine a kinetic contrast effect with respect any blocking materials, such as, for example, splashes of steel, slag, dust, which could cause a blockage of the injector devices 110.

The inert gas G2 can be selected from a group comprising nitrogen, helium, argon, neon, xenon, krypton or a combination thereof.

By way of example, if the inert gas G2 is nitrogen gas, the pressure of the inert gas G2 at exit from the second supply means 15 can be approximately 10 bar and the maximum flow rate approximately 600 $Nm^3/h$ for each injector device 110.

The apparatus 10 also comprises a second secondary feed line 17, favorably distinct from the first secondary feed line 14, fluidically connected to third supply means 18 and configured to selectively supply the purge gas G3 to each of the injector devices 110.

The purge gas G3 is normally air, preferably compressed, it is supplied in continuity, or partly simultaneously, with the inert gas G2, and only has the function of preventing the injector devices 110 from clogging, as described above in relation to the inert gas G2.

By way of example, if the purge gas G3 is compressed air, its pressure at exit from the third supply means 18 can be approximately 6 bar and its maximum flow rate approximately 600 $Nm^3/h$ for each injector device 110.

In general terms, the supply pressures of the inert gas G2 and of the purge gas G3 are always higher than the supply pressure of the process gas G1. In particular, the supply pressure of the purge gas G3 is preferably intermediate between the supply pressure of the process gas G1 and the supply pressure of the inert gas G2.

The main feed line 11, the first secondary feed line 14 and the second secondary feed line 17 share common terminal segments 20, each of which is fluidically connected to a respective injector device 110. In the example given here, the terminal segments 20 are part of the main feed line 11.

The apparatus 10 also comprises, for each of the injector devices 110, a regulation unit 21 disposed on each terminal segment 20 and configured to regulate the flow rate of the one gas among the process G1, inert G2, or purge G3 gases which is temporarily conveyed toward the corresponding injector device 110.

Only two regulation units 21 are shown in the attached diagram, by way of example, although their number is N, that is, equal to the number of injector devices 110.

Providing a common regulation unit 21 in the specific terminal segment 20 where, during use, the three gases G1, G2, G3 that feed a determinate injector device 110 transit, in turn or partly simultaneously, allows to reduce the overall number of components that constitute the apparatus 10, and therefore its cost.

This configuration of the apparatus 10 guarantees a higher level of safety than the current standard because the secondary feed lines 14 and 17 are also controlled continuously and no longer only in "open/closed" mode, that is, with a fixed point, therefore instant by instant it is possible to regulate the flow rate according to requirements. A direct consequence of this is that, regardless of the state of deterioration of the apparatus 10, it is possible to maintain high operating performance over time.

In the example given here, the main feed line 11 branches, in correspondence with a first branch point R1, into the same number N of peripheral main feed lines 11', 11", $11^N$, each fluidically and terminally connected to a single injector device 110.

Each of the two secondary feed lines 14 and 17 also branches, respectively in correspondence with a second and third branch point R2 and R3, into the same determinate number N of peripheral secondary feed lines 14', 17'; 14", 17"; . . . ; $14^N$, $17^N$.

Moreover, for each regulation unit 21 and therefore for each injector device 110, a respective first and second peripheral secondary feed line $14'$-$14^N$ and $17'$-$17^N$ connect to a corresponding peripheral main feed line $11'$-$11^N$ in a same connection point P upstream of the corresponding regulation unit 21.

Therefore, each injector device 110 is fed by means of three dedicated peripheral feed lines, of which one main $11'$-$11^N$ and two secondary $14'$-$14^N$ and $17'$-$17^N$, which flow into a common terminal segment 20.

Each common terminal segment 20 is comprised between the connection point P where the secondary feed lines $11'$-$11^N$, $14'$-$14^N$ and $17'$-$17^N$, dedicated to a determinate injector device 110, join and the injector device 110 itself.

In the example given here, the first peripheral secondary feed line 14' connects to the second peripheral secondary feed line 17' and the latter to the peripheral main feed line 11' at the connection point P.

According to other embodiments, not shown in the drawings, each first and second peripheral secondary feed line $14'$-$14^N$ and $17'$-$17^N$ connects to a corresponding peripheral main feed line $11'$-$11^N$ at two distinct connection points wherein, preferably, the connection point of the first peripheral secondary feed line $14'$-$14^N$ is upstream of the connection point of the second peripheral secondary feed line $17'$-$17^N$.

Each regulation unit 21 comprises, in the direction of the flow of the gas G1, G2, G3 in transit, at least a flow meter 22 and a regulation valve 23. Preferably, each regulation unit 21 also comprises a pressure meter 24.

In particular, the flow meter 22 is configured to measure the volumetric flow rate of the gas G1, G2, G3 in transit by measuring the speed of the latter which, multiplied by the passage section, gives the volumetric flow rate.

The regulation valve 23 can be, for example, a proportional valve of a type known per se, which can be actuated pneumatically, electromechanically or hydraulically.

The apparatus 10 also comprises a control unit 25 operatively connected both to the three supply means 12, 15, 18 and also to the N regulation units 21, and configured at least to control the selective activation/deactivation of the first, second and third supply means 12, 15, 18 and the selective calibrated opening/closing of the regulation valves 23, at least on the basis of a measurement signal S emitted by the flow meters 22.

The control unit 25 is configured to perform a compensation of the measurement signal S on the basis of physical parameters, such as temperature, density and pressure, of the gasses G1, G2, G3 in transit, in order to obtain a compensated measurement signal S' (not shown in the attached diagram) which represents a mass flow value. In fact, the volumetric flow rate is the measured variable while the mass flow is the controlled variable.

The control unit 25 is configured to also perform an initial calibration of each regulation valve 23, on the basis of certain reference values relating to the travel of the mobile member of the latter, which determines the gas passage section. The reference values are proportional to the flow rate quantity of the process G1, inert G2 or purge G3 gas required in that moment. For example, the reference value with which each regulation valve 23 is initially calibrated when the process gas G1 passes through it is established on the basis of the metallurgical process in progress in the melting furnace 100, while the reference value of the purge gas G3 is established on the basis of the need to prevent clogging of the injector devices 110.

In accordance with one embodiment, the control unit 25 is programmed to perform a closed loop control, that is, a feedback control, of the flow rate of the process gas G1 and of the purge gas G3 since, normally, the supply of both the process gas G1 and also the purge gas G3 occurs for rather long periods of time T2 and T3, of 10-20 minutes and 20-40 minutes, respectively; T3 can however vary further, for example as a function of waiting times.

In this case, the compensated measurement signal S' is compared with the reference value with which the corresponding regulation valve 23 was initially calibrated. On the basis of any deviation detected, the control unit 25 is able to generate a control signal C which is sent to the actuator of the regulation valve 23 in order to open or close it further.

In accordance with another embodiment, the control unit 25 is programmed to perform an open loop control, that is, a control without feedback signals, of the flow rate of the inert gas G2, since the supply of the inert gas G2 normally occurs in the period of time T1, usually shorter than about 10 seconds, therefore a feedback regulation would not be effective. In fact, the transient of the flow rate regulation, that is, the time that elapses between the change of the flow rate target value and the effective achievement of the flow rate itself, occurs in about 20-30 seconds.

In this other case, the flow rate value measured by the flow meter 22 and sent to the control unit 25 is not compared with a reference value, but used only to check that a sufficient flow rate of inert gas G2 passes. The latter has to be greater than, or at least equal to, a minimum value, and it is regulated by the control unit 25 by means of the regulation valve 23, which will be calibrated with a suitable reference value. When the flow rate of inert gas G2 is not sufficient, the control unit 25 commands a greater opening of the regulation valve 23, otherwise the regulation valve 23 is kept in the condition in which it was when the flow rate was detected.

The reference values of the regulation valve 23 and the corresponding flow rate values of the inert gas G2 are stored in the control unit 25 in order to be used in the subsequent supply cycles of the inert gas G2. For example, if to a determinate reference value of the regulation valve 23 there corresponds a flow rate value of the inert gas G2 greater than 40% of the minimum value required, at the next supply cycle of the inert gas G2 the regulation valve 23 will be calibrated with a reference value in order to determine a passage with a lower flow rate.

Being able to also calibrate the flow rates of the inert gas G2 and of the purge gas G3 allows to prevent unwanted effects inside the melting furnace 100, for example effects such as the so-called "splashing" and the oxidation of the corresponding electrodes.

In possible embodiments, the control unit 25 is programmed to perform a control of the flow rates also on the basis of pressure measurements supplied in terms of signals by the pressure meter 24 and possibly by additional pressure meters disposed along the lines.

The apparatus 10 also comprises a plurality of shut-off devices disposed along the feed lines 11, 14, 17 upstream of the connection point P. These shut-off devices are not normally used to regulate the flow rate of the gas passing through them, but they only have a safety function, or a function of simply opening/closing the line in "open/closed" mode. The shut-off devices can comprise, for example, safety valves 27, valves of the "open/closed" type 28 actuated by the control unit 25, manual regulation valves 29, non-return valves 30, pressure reducers 31, pressure gauges 32, filters, temperature detectors, density calculations based on temperature and pressure, the gas type being known, and others, all of a type known per se. Therefore, the example diagram attached here must not be considered as limiting, but only as an example.

In general, the shut-off devices as above can form part of the supply means 12, 18 of the feed lines 11, 14, 17 to which they refer.

Therefore, although in the diagram of the attached drawing the supply means 12, 15, 18 are identified by way of example only with a rectangle at the beginning of the corresponding feed line 11, 14, 17, they can also comprise other components, for example valves, which are located along the line they feed.

The apparatus 10 also comprises a ventilation, or vent, line 26 fluidically connected at least to the main feed line 11. In particular, each peripheral main feed line $11'$-$11^N$ is fluidically connected to the ventilation line 26 by means of a secondary ventilation line $26'$, $26''$, ..., $26^N$.

In possible embodiments, the first secondary feed line 14 of the inert gas G2 can also be connected to the ventilation line 26, for example by means of a single connection branch provided before the branch point R2 of the secondary feed line 14. Alternatively, each peripheral secondary feed line $14'$-$14^N$, $17'$-$17^N$ can comprise a peripheral connection branch connected to the ventilation line 26.

The operation of the apparatus 10 described heretofore, which corresponds to the method according to the present invention, comprises the following steps:

a main feed step, in which the first supply means 12 selectively supply the process gas G1 to each of the injector devices 110 through the main feed line 11;

a first secondary feed step, in which the second supply means 15 selectively supply the inert gas G2 to each of the injector devices 110 through the first secondary feed line 14;

a second secondary feed step, in which the third supply means 18 selectively supply the purge gas G3 to each of the injector devices 110 through the second secondary feed line 17.

In each of the feed steps, the flow rate of each of the gases G1, G2, G3 is selectively regulated by means of the corresponding regulation units 21, each disposed on a respective one of the terminal segments 20.

Advantageously, the first secondary feed step occurs in continuity with the main feed step. The second secondary feed step partly overlaps with the first secondary feed step. Therefore there is a period of time, for example comprised between 1 second and 5 seconds, in which both the inert gas G2 and also the purge gas G3 are supplied.

Advantageously, the control of the individual regulation units 21 can occur independently. Therefore, the flow rate of the process G1, inert G2 and purge G3 gases can be different for each injector device 110.

It is clear that modifications and/or additions of parts or steps may be made to the apparatus 10 and to the method for supplying gasses G1, G2, G3 to a melting furnace 100 for the production of metal as described heretofore, without departing from the field and scope of the present invention, as defined by the claims.

It is also clear that, although the present invention has been described with reference to some specific examples, a person of skill in the art will be able to achieve other equivalent forms of apparatuses and methods for supplying gasses to a melting furnace for the production of metal, having the characteristics as set forth in the claims and hence all coming within the field of protection defined thereby.

In the following claims, the sole purpose of the references in brackets is to facilitate reading and they must not be considered as restrictive factors with regard to the field of protection defined by the claims.

The invention claimed is:

1. An apparatus for supplying gas to a melting furnace for the production of metal, wherein said melting furnace has a plurality of a determinate number of injector devices, wherein said apparatus comprises:
   first supply means configured to selectively supply a process gas to said injector devices;
   second supply means configured to selectively supply an inert gas to said injector devices;
   third supply means configured to selectively supply a purge gas to said injector devices;
   a main feed line fluidically connected to said first supply means and configured to selectively supply said process gas to each of said injector devices, after a first branch, in correspondence with a first branch point, into a number of peripheral main feed lines equal to said determinate number;
said apparatus further comprising
   a first secondary feed line fluidically connected to said second supply means and configured to selectively supply said inert gas to each of said injector devices, after a second branch, in correspondence with a second branch point, into a number of first peripheral secondary feed lines equal to said determinate number;
   a second secondary feed line fluidically connected to said third supply means and configured to selectively supply said purge gas to each of said injector devices, after a third branch, in correspondence with a third branch point, into a number of second peripheral secondary feed lines equal to said determinate number;
   a same determinate number of connection points, each of which is disposed downstream of said branches and upstream of each of said injector devices and in which one of said peripheral main feed lines, as well as one of said first peripheral secondary feed lines and also one of said second peripheral secondary feed lines converge;
   a same determinate number of terminal segments each of which fluidically connects one of said connection points to one of said injector devices;
   a same determinate number of regulation units each disposed on one of said terminal segment and configured to regulate the flow rate of the one gas amongst said process gas, inert gas and purge gas that is temporarily conveyed toward one of said injector devices.

2. The apparatus as in claim 1, wherein said determinate number is an integer comprised between 2 and 20.

3. The apparatus as in claim 1, wherein each of said regulation units comprises, in sequence, a flow meter and a regulation valve which is configured to be commanded in a calibrated manner in order to regulate the flow rate of one or more of said gasses in transit in the corresponding one of said terminal segments on the basis of both the process requirements and also the type of gas in transit.

4. The apparatus as in claim 3, further comprising a control unit operatively connected both to said first, second and third supply means and also to said regulation units, and configured at least to control the selective activation/deactivation of said first, second and third supply means and the selective calibrated opening/closing of said regulation valves at least on the basis of a measurement signal emitted by said flow meter of the respective regulation unit.

5. The apparatus as in claim 4, wherein said control unit is programmed to perform an open loop control of the flow rate of said inert gas.

6. The apparatus as in claim 4, wherein said control unit is programmed to perform a closed or open loop control of the flow rate of said process gas and of said purge gas.

7. The apparatus as in claim 1, further comprising a ventilation line connected at least to said main feed line, wherein each of said peripheral main feed lines is fluidically connected to said ventilation line by means of a secondary ventilation line which is located upstream of each of said connection points.

8. A method for supplying gas to a melting furnace for the production of metal, wherein said melting furnace has a plurality of a determinate number of injector devices, comprising the following steps:
   providing first supply means to selectively supply a process gas to said injector devices through a main feed line;
   providing second supply means to selectively supply an inert gas to said injector devices through a first secondary feed line
   providing third supply means to selectively supply a purge gas to said injector devices through a second secondary feed line,
   a main feed step, in which said first supply means selectively supply said process gas to each of said injector devices through said main feed line, after a first branch, in correspondence with a first branch point, into a number of peripheral main feed lines equal to said determinate number;
said method further comprising:
   a first secondary feed step, in which said second supply means selectively supply said inert gas to each of said injector devices through said first secondary feed line, after a second branch, in correspondence with a second branch point, into a number of first peripheral secondary feed lines equal to said determinate number;
   a second secondary feed step, in which said third supply means selectively supply said purge gas to each of said injector devices through said second secondary feed line, after a third branch, in correspondence with a third branch point, into a number of second peripheral secondary feed lines equal to said determinate number;
wherein there is provided a determinate number of connection points, each of which is disposed downstream of said branches and upstream of each of said injector devices, and in which one of said peripheral main feed lines, as well as one of said first peripheral secondary feed lines and also one of said second peripheral secondary feed lines converge;
wherein there is also provided a same determinate number of terminal segment, each of which fluidically connects one of said connection points to one of said injector devices; and
wherein in each of said three feed steps the flow rate of each of said process gas, inert gas and purge gas is selectively regulated by means of a same determinate number of regulation units, each disposed on a respective one of said terminal segments.

9. The method as in claim 8, further comprising a measuring step, in which the flow rate of each of said process gas, inert gas and purge gas passing through a corresponding one of said regulation units is measured by means of a respective flow meter and regulated by means of a respective regulation valve which are present in the corresponding regulation unit, and a control step in which a control unit controls the selective activation/deactivation of said first, second and third supply means and the selective calibrated opening/closing of said regulation valves at least on the basis of a measurement signal emitted by the corresponding flow meter.

10. The method as in claim 9, wherein said control unit performs an open loop control of the flow rate of said inert gas.

11. The method as in claim 9, wherein said control unit performs a closed or open loop control of the flow rate of said process gas and of said purge gas.

12. The method as in claim 9, wherein said control unit performs a compensation of said measurement signal on the basis of physical parameters comprising, or consisting of, at least one of either temperature, density or pressure of said process gas, inert gas and purge gas, in order to obtain a compensated measurement signal which represents a mass flow value and is used by said control unit to generate a control signal for each of said regulation valves.

* * * * *